United States Patent [19]

Machat

[11] 4,368,872

[45] Jan. 18, 1983

[54] PRESSURE FLUID REGULATING VALVE, PARTICULARLY PRESSURE REDUCING VALVE

[75] Inventor: Götz D. Machat, Lohr, Fed. Rep. of Germany

[73] Assignee: G. L. Rexroth GmbH, Lohr, Fed. Rep. of Germany

[21] Appl. No.: 212,677

[22] Filed: Dec. 3, 1980

[30] Foreign Application Priority Data

Dec. 7, 1979 [DE] Fed. Rep. of Germany ....... 2949231

[51] Int. Cl.³ .......................................... F16K 31/363
[52] U.S. Cl. ..................................... 251/63; 251/120; 251/324; 137/489
[58] Field of Search .......................... 137/489, 625.69; 251/120, 324, 63

[56] References Cited

U.S. PATENT DOCUMENTS 3,489,163 1/1970 Brietsprecker ................. 137/489 X
4,220,178 9/1980 Jackson .......................... 251/324 X Primary Examiner—Alan Cohan
Attorney, Agent, or Firm—Michael J. Striker

[57] ABSTRACT

The pressure fluid regulating valve has a central blind bore provided with axially spaced inlet and outlet openings, a sliding spool movable in the blind bore and defining two piston-like areas at its ends and an intermediate recessed portion having inclined walls and a central flange of a trapezoidal contour; a central bore in the spool interconnects via a throttling passage the end faces of the piston-like areas and communicates also with the recessed portion; the recessed area in the rest position of the spool interconnects the inlet and outlet openings and the inclination of respective sloping walls of the recessed portion and of the flange is selected so as to ensure a substantially uniform flow through the passage in any axial position of the spool.

2 Claims, 6 Drawing Figures

PRESSURE FLUID REGULATING VALVE, PARTICULARLY PRESSURE REDUCING VALVE

BACKGROUND OF THE INVENTION

This invention relates in general to a regulating valve for a pressure fluid, and in particular to a pressure reducing valve of the type which has a valve body defining a bore, an inlet port and an outlet port communicating, in an axially spaced relationship, with the bore, and a sliding spool axially movable in the bore.

In a known pressure reducing valve of the aforedescribed type, the flange in the intermediate recess of the spool has the same outer diameter as the piston area at respective ends of the spool, and in the rest position of the spool the flange is located in the range of the inlet port at the high pressure side, whereas in the closing position of the spool it takes place at the level between the inlet port and the outlet port to close an opening in an inwardly projecting shoulder of the valve housing. The walls of the end portions of the spool facing the annular flange are perpendicular to the longitudinal axis of the sliding spool. The intermediate flange of the spool serves in this case for changing the cross section or closing a connecting bore in the valve housing (Zoebl, "Oel Hydraulik," Wien, Springer Verlag, 1963, p. 158).

The disadvantage of this prior-art solution lies in the fact that during its movement the sliding spool is subject to excessive axial forces exerted by the streaming pressure fluid.

SUMMARY OF THE INVENTION

It is therefore a general object of the present invention to overcome the aforementioned disadvantage.

More particularly, it is an object of the invention to reduce the axial force exerted on the sliding spool by the pressure fluid.

In keeping with this object, and others which will become apparent hereafter, one feature of the invention resides, in a pressure reducing valve of the aforedescribed type, in the provision of a recessed portion between the end piston areas of the spool for interconnecting at least in the central axial position of the spool the inlet and outlet ports and an intermediate piston-like flange of a trapezoidal axial cross section, the diameter of the flange being smaller than that of the bore, the end walls of the recessed portion sloping toward the flange to permit a substantially uniform flow through the recess in any axial position of the spool.

The intermediate, trapezoidal flange of reduced diameter does not serve, therefore, for changing the cross section of a connecting bore in the valve housing, but it serves for the generation of a counterforce acting on the sliding spool against the force of pressure fluid attacking at least one of the end piston areas of the spool, whereby pressure fluid flowing through the recessed portion between the end piston areas is deviated by the trapezoidal flange. In all control positions of the sliding spool in which the pressure fluid flows through the valve, a substantially uniform throttling effect on the pressure fluid takes place in the range of the trapezoidal flange, whereby the throttling of the pressure fluid, generated by a variable throttling cross section of the piston areas of the spool itself, is preserved. The contour of the central recessed portion and of the trapezoidal flange is selected such that a balance between the axial force exerted by the flowing pressure fluid and the generated counterforce by the deviated pressure fluid, be obtained.

The novel features which are considered as characteristic for the invention are set forth in particular in the appended claims. The invention itself, however, both as to its construction and its method of operation, together with additional objects and advantages thereof, will best be understood from the following description of specific embodiments when read in connection with the accompanying drawing.

BRIEF DESCRIPTION OF THE DRAWING

FIG. 5 is a side view of the sliding spool of FIG. 3; and

DESCRIPTION OF THE PREFERRED EMBODIMENTS

Figure 1:
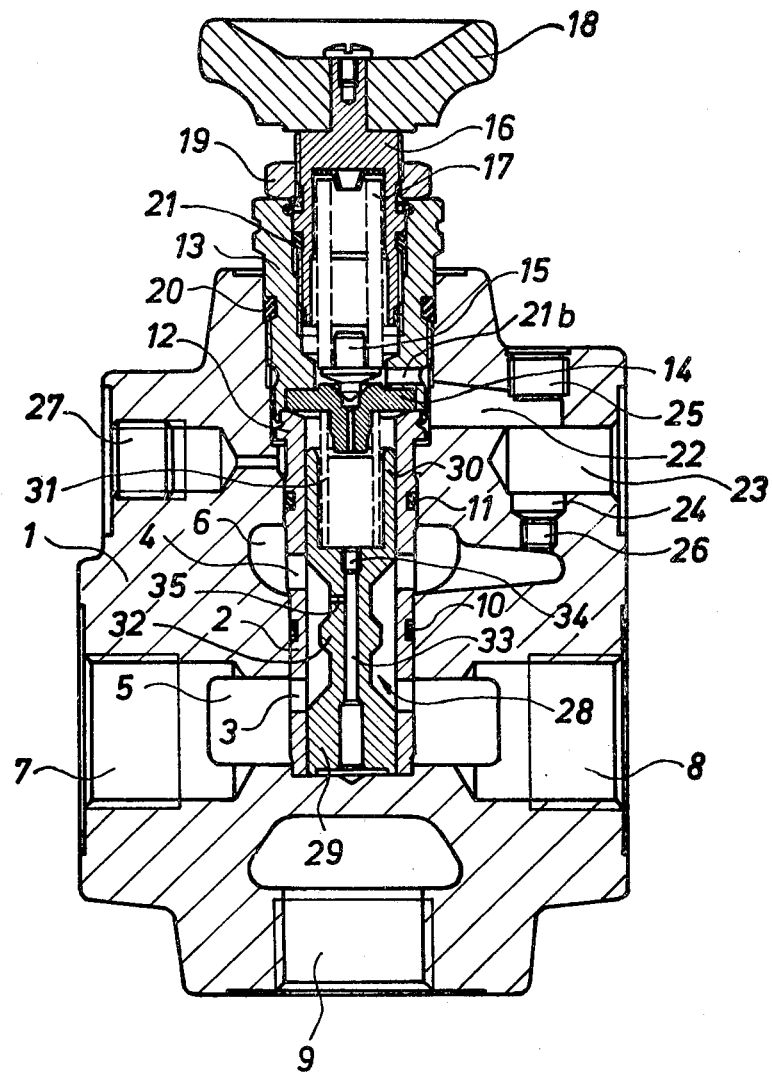
FIG. 1 is a sectional view of a first embodiment of a regulating valve of this invention.

Referring firstly to FIG. 1, a valve housing 1 is formed with a blind bore in which a sleeve 2 with axially spaced openings 3 and 4 is inserted. Each set of the openings 3 and 4 communicates with one of annular channels 5 and 6 formed in the housing 1 around the sleeve 2. The annular channel 5 communicates with two juxtaposed inlet ports 7 and 8 which are connectable to a non-illustrated high pressure side of a source of pressure fluid. The annular channel 6 communicates via a channel in the housing 1 with an outlet port 9 arranged coaxially at spaced relationship with the sleeve 2 and being connectable to a non-illustrated low pressure side of the source of pressure fluid. The bottom of the blind bore in the housing 1 with the inserted sleeve 2 exceeds slightly the annular channel 5. As mentioned before, the annular channel 6 is located at a distance from the annular channel 5. The gap between the housing 1 and the sleeve 2 is sealed by a sealing ring 10 located between the annular grooves 5 and 6. A corresponding sealing ring 11 is provided between the housing and the sleeve 2 in the region between the upper end of the sleeve and the annular channel 6. The upper end of the sleeve 2 is formed with an outwardly directed flange 12 resting on an inner step in the axial blind bore in the housing 1. Another sleeve provided with outer threads is screwed into the upper portion of the blind bore above the inner step and clamps a valve body 14 provided with a central pressure reducing bore, against the flange 12 of the sleeve 2. The upper part of the central bore in the valve body 14 is extended into a valve seat which is controlled by a valving member 15. The valve member 15 is compressed against the seat by a pressure spring 17 resting on a shoulder of the valve member 15 and being compressed by still another threaded sleeve 16 engaging an inner thread in the sleeve 13. By screwing or unscrewing the innermost sleeve 16, the pressure of the biasing spring 17 and thus the closing force of the valve member 15 can be adjusted. For this purpose, the innermost threaded sleeve 16 is provided with a control knob 18 secured to the outer end of the sleeve 16. The adjusted position of the sleeve 16 is secured by a lock nut 19. The gap between the inner wall of the upper extended part of the blind bore in the housing 1 and the threaded sleeve 13 is sealed by means of sealing ring 20, and the gap between the inner wall of the sleeve 13 and the outer wall of the sleeve 16 is sealed by a sealing ring 21. A radial bore 21*b* is provided in the wall of the sleeve 13 at the level of the valve member 15 when the latter is in its closing position; the radial bore 21*b* permanently connects via a radial channel 22 in the housing 1 the interior of the threaded sleeve 13 and of sleeve 16 to a control port 33. A bore 24 extending parallel to the central blind bore in the housing 1 intersects the annular channel 6, the control port 23, the radial channel 22 and opens into the outer surface of the housing 1. The exit of the channel 24 is closed by a plug 25 and so is closed the communication between the control port 23 and the annular ring 6 by a plug 26. A plug 27 closes a bore provided in the housing opposite the control port 23 and leading to the interspace between the sleeve 2 and the inner wall of the blind bore.

Sliding spool 28 is axially movable in the passage delimited by the sleeve 2. Each end of the spool 28 defines a piston area 29 and 30 which are in contact with the inner wall of the sleeve 2. The end face of the sleeve 2 is provided with a cutting edge which is compressed by means of the threaded sleeve 13 against the bottom of the blind bore in the housing 1 so that the gap between the lowermost portion of the sleeve 2 and the annular channel 5 is sealingly closed. The upper piston 30 of the spool 28 is formed with a well for receiving a pressure spring 31 extending between the bottom surface of the well and the valve body 14. The outer region between the piston areas 29 and 30 is recessed and provided with an intermediate flange 32 the function of which will be explained below. The bottom of the well in the upper piston 30 communicates via a throttling member 34 with an axial passage 33 opening at the other face of the spool 28. A radial bore connects also the recessed portion near the upper part of the flange 32 with the axial passage 33 below the throttling member 34.

The intermediate flange 32 in the central recess has a trapezoid-shaped axial cross section and at the same time the opposite walls of the recessed portion between the piston areas 29 and 30 are inclined so as to form an angle between 40° and 70° with the floor of the recessed portion. These inclined walls of the piston areas 29 and 30, as well as the inclined sides of the flange 32, can have also a curved contour corresponding to a jacket of a rotational body.

Figure 3:
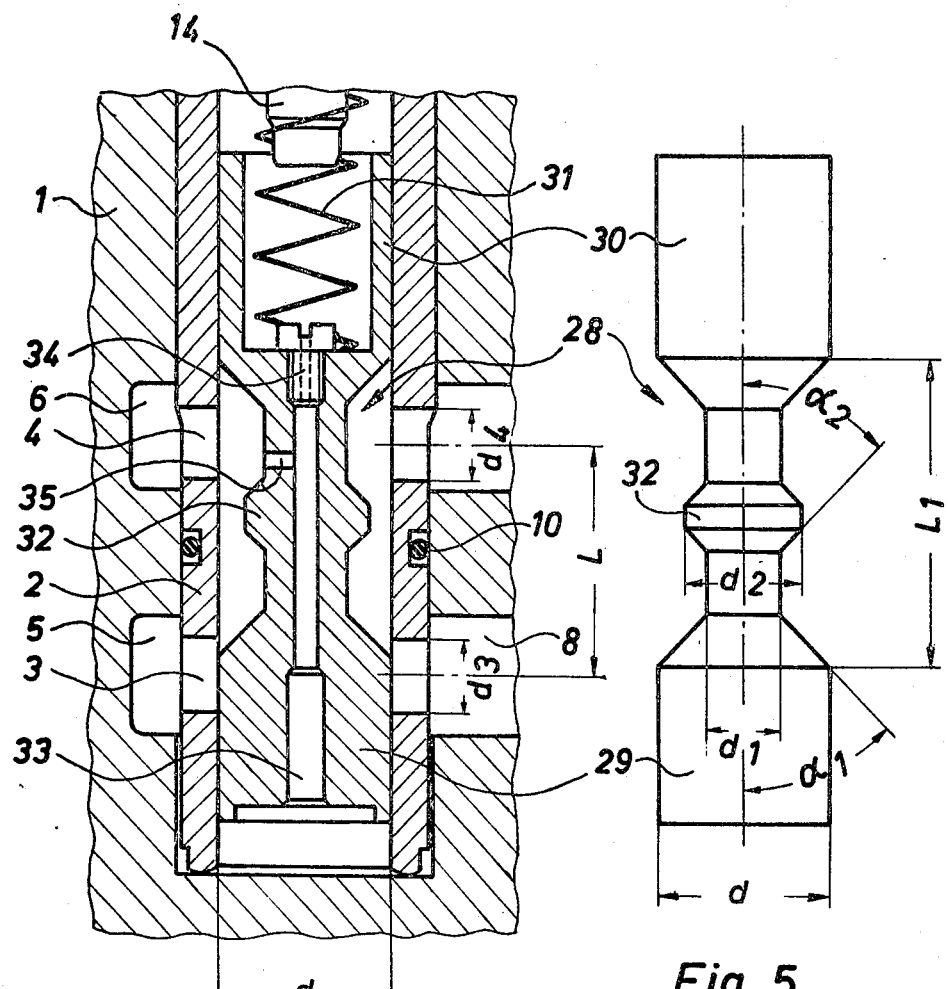
FIG. 3 is a cut-away sectional view version of the sliding spool of FIG. 1 on an enlarged scale.

In FIGS. 3 and 5, there are illustrated different dimensions of respective parts of the sliding spool and the assigned inlet and outlet ports. In these Figures, d denotes the outer diameter of the two piston areas 29 and 30, $d_1$ is the outer diameter of the intermediate part (the neck) of the spool between the piston areas 29 and 30, $d_2$ is the outer diameter of the central part of the intermediate flange 32, L is the distance between the centers of inlet and outlet ports 3 and 4, $L_1$ is the distance between control edges of the sliding spool 28, $d_3$ and $d_4$ denote, respectively, the diameters of the inlet and outlet ports 3 and 4, $a_1$ is the angle of inclination of end wall of the intermediate recessed portion of the spool 28 near the inlet port, and $a_2$ is the angle of inclination of the inclined wall of the trapezoidal central flange 32 near the inlet port.

In the following examples there are indicated characteristic relationships between the above-defined parameters applicable for conventional nominal values of pressure reducing valves, whereby the value enclosed in parentheses is the optimum value:

$$d/d_1 = 2.0 \ldots (2.5) \ldots 3.5$$

$$d/d_2 = 1.0 \ldots (1.5) \ldots 2.0$$

$$d/d_3 = 1.5 \ldots (2.7) \ldots 4.0$$

$$d/d_4 = 1.5 \ldots (2.5) \ldots 4.0$$

$$L/d = 1.0 \ldots (1.1 \text{ to } 1.4) \ldots 3.0$$

$$L \leq L_1 \leq L + (d_3 + d_4)/2$$

$$a_1 \leq a_2 \leq 40° \ldots (47°) \ldots 70°$$

The magnitude of the ratio L/d (1.06 in the first exemplary embodiment) determines the mode of admission of the pressure medium on the opposite end faces of the sliding spool 28.

Figure 2:
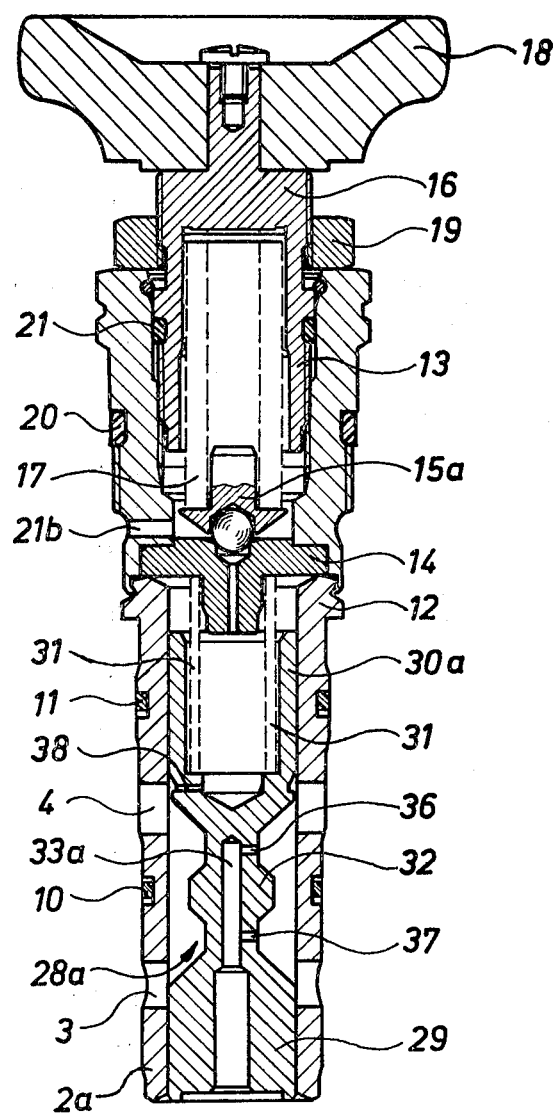
FIG. 2 is a sectional view of a second embodiment of a regulating valve of this invention.

In the position of the sliding spool 28 as indicated in FIG. 1, the annular channel 5 connected to the high pressure side communicates via openings 3 in the sleeve 2 with one end of the recessed intermediate portion of the sliding spool 28, whereas the upper end of the recessed portions communicates via openings 4 with the annular channel 6 connected to the low pressure side of the source of pressure fluid. Pressure fluid present in the recessed intermediate portion flows through the radial passage 35 and the central passage 33 on the lower end face of the piston area 29, and simultaneously through the throttling member 34 on the upper end face of the piston area 30. As long as pressure in the annular channel 5 is smaller than the pressure in the annular channel 6, sliding spool 28 remains in its rest position as illustrated in FIG. 1. If, however, pressure in the annular channel 6 reaches a predetermined opening value for the preliminary control valve 14 and 15, pressure fluid starts flowing via the radial bore 21*b*, the radial channel 22 and the control port 23 to a reservoir. As a consequence, a pressure difference occurs between the end faces of the sliding spool 28 and causes the same to move in the direction towards the valve body 14 of the preliminary control valve. During this movement, the piston area 29 starts closing the inlet openings 3 (FIG. 2). Due to the reduced cross section of the opening 3, the incoming pressure medium is throttled, and consequently pressure in the annular channel 6 is held approximately at a constant value.

Figures 4, 6:
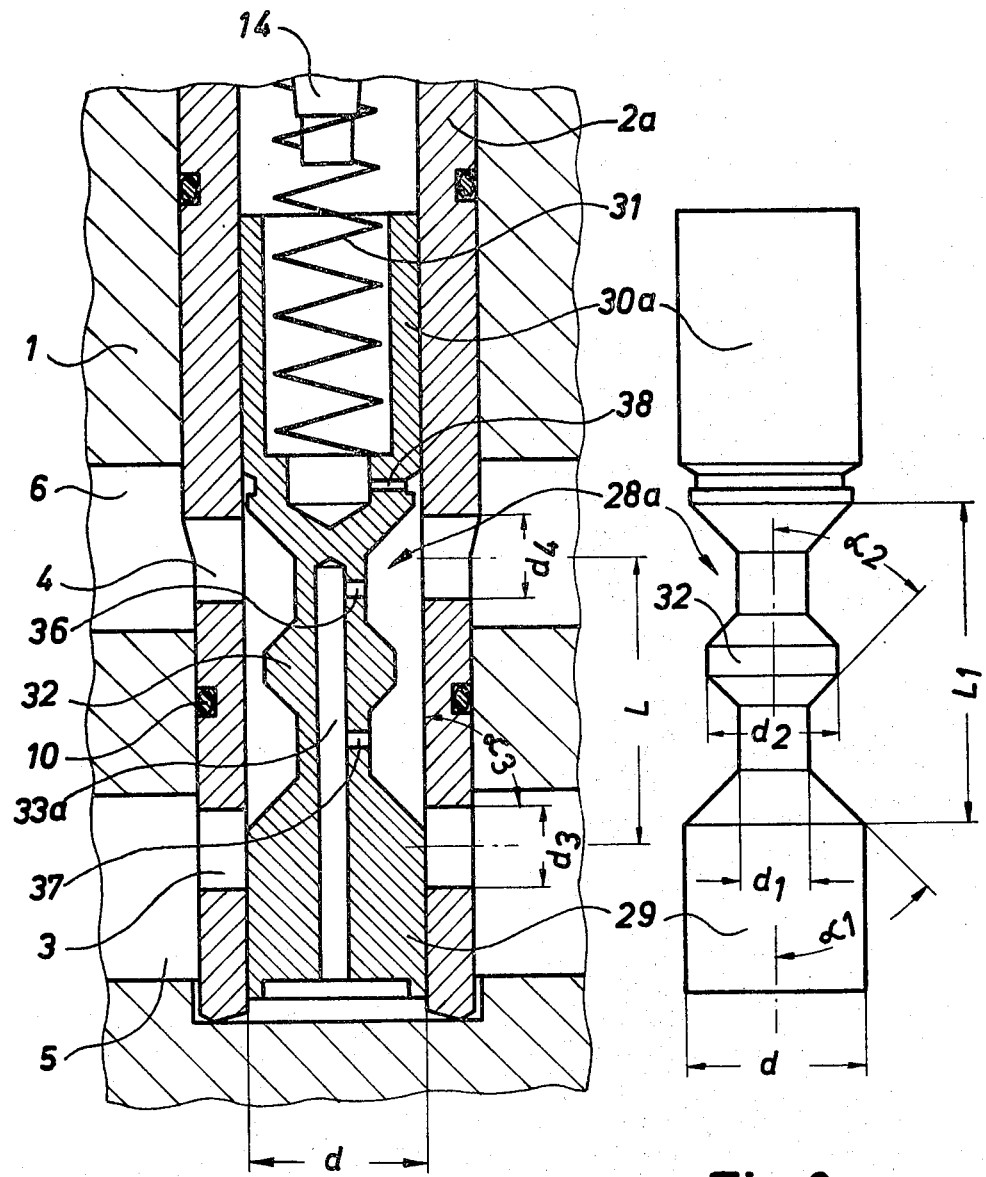
FIG. 4 is a cut-away sectional view of the sliding spool of FIG. 2 on an enlarged scale.
FIG. 6 is a side view of the sliding spool of FIG. 4.

In the second embodiment of the sliding spool according to FIGS. 2, 4 and 6, the same component parts are designated by like reference numerals, while reference numerals pertaining to modified component parts are complemented by a character "a." In this second embodiment, the central sleeve 2*a* is extended in length and the inlet and outlet openings 3 and 4 in the sleeve have an increased distance L between their central points, in comparison to the first embodiment. Due to these changes, the flow of pressure medium through the recessed portion of the spool 28 acts with a different force on the sloping surfaces of the recessed portion than in the preceding example.

In the sliding spool 28 according to FIGS. 2 and 4 where the ratio L/d equals 1.36, the central bore 33a is a blind bore so that the end faces of the sliding spool do not communicate with each other. Two radial bores 36 and 37 connect the central blind bore 33a with the recessed portion at both sides of the trapezoidal flange 32. The central blind bore 33a opens unilaterally in the end face of the spool adjoining the piston area 29. A further radial bore 38 connects the well in the upper piston area 30a, accommodating the biasing spring 31, with an annular space which in the rest position of the spool communicates with the upper part of outlet openings 4 in the sleeve 2a. As depicted in FIG. 4, the lower edge of the annular space communicating with the radial bore 38 is in the range of the latter slightly recessed so that a passage to the bore 38 is always present in any position of the spool. On the other hand, as mentioned before, no internal communication takes place between the blind bore 33a and the end face of the piston area 30a.

When pressure fluid is admitted in the chamber resulting between the recessed central area of the spool and the inner wall of the sleeve 2a, it flows via the radial bores 36 and 37 arranged at both sides of the trapezoidal flange 32, and via the central blind bore 33a on the end face of the piston area 29, and at the same time the pressure fluid flows through the throttling radial bore 38 at a pressure which builds up in the range of the outlet opening 4 on the end face of the piston area 30a. The resulting balance of forces in this embodiment is the same as in the regulating valve according to FIG. 1.

The inner wall of the central sleeve 2 in both embodiments is cylindrical. In a modification, however, in the short range between the inlet and outlet openings 3 and 4, it can be conically extended. In FIG. 4, this short range of the inner wall of the sleeve 2a has an angle $a_3$ of 90°. This angle can be smaller than 90°, and according to the design of the valve it can amount to 30° only. The different range of the conically sloping wall of the sleeve 2a is between 90° and 60°. The smaller angle $a_3$ is selected, the larger force of the pressure fluid acts on the sliding spool 28 in the opening direction. Pressure fluid entering through the inlet opening 3 is deviated by the trapezoidal central flange 32 and flows through the restricted area between the crest of the flange and the inner wall of the central sleeve 2. Due to the deviation and higher density of flow in the restricted area, a twist or torsional momentum is generated which acts in the opening direction of the sliding spool 28.

In the case when angle $a_3$ is smaller than 90°, the diameter of the central sleeve 2 in the range between the inlet and outlet openings 3 and 4 is larger than the diameter of the piston area 29 and/or of the piston area 30a, whereby the diameters of respective piston areas 29 and 30 can be different. It is advantageous when the piston area 30 has a larger diameter than that of the piston area 29.

Provided that the central trapezoidal flange 32 be missing, pressure fluid flowing through the chamber between the inner wall of the central sleeve 2 and the recessed intermediate region of the sliding spool 28 would exert a force on the piston areas 29 and 30 which would tend even at a minute pressure gradient at a certain rate of flow to move the sliding piston 28 in the closing direction toward the valve body 14, and thus to cover by the piston area 29 the inlet opening 3. By virtue of the trapezoidal central flange 32, this positive force acting in the closing direction is counteracted by the deviation of the pressure fluid stream on the inclined walls of the flange 32 and due to the resulting negative force acting in the opening direction against the inner wall of the central sleeve 2. In this manner even at very large pressure gradients between the inlet pressure and the outlet pressure, the regulating function of the valve remains preserved for the amounts of pressure fluid determined by the maximum cross section of the passage.

The sliding spool exhibiting similar relationships at the fluid inlet and outlet areas can be also employed as a pressure balance in flow regulators. The preferred pressure medium is a liquid, particularly a hydraulic oil.

It will be understood that each of the elements described above, or two or more together, may also find a useful application in other types of constructions differing from the types described above.

While the invention has been illustrated and described as embodied in a pressure reducing valve, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt if for various applications without omitting features that, from the standpoint of prior art, fairly constitute essential characteristics of the generic or specific aspects of this invention.

What is claimed as new and desired to be protected by Letters Patent is set forth in the appended claims:

1. A pressure fluid regulating valve, particularly a pressure reducing valve, comprising a valve body defining a bore, an inlet port and an outlet port opening in an axially spaced relationship into the bore, a sliding spool axially movable in the bore, the spool being formed with end piston areas bounding a recessed portion interconnecting in at least a central axis position of the spool said inlet and said outlet port, and an intermediate trapezoidal flange provided in said recessed portion, the diameter of said flange being smaller than that of said bore, the end walls of said recessed portion sloping towards said flange to permit a substantially uniform flow through said recess in any axial position of said spool; said spool having a central bore interconnecting the end faces of said piston areas and communicating with said recessed portion in the range of said outlet port.

2. A pressure fluid regulating valve, particularly a pressure reducing valve, comprising a valve body defining a bore, an inlet port and an outlet port opening in an axially spaced relationship into the bore, a sliding spool axially movable in the bore, the spool being formed with end piston areas bounding a recessed portion interconnecting in at least a central axial position of the spool said inlet and outlet port, and an intermediate trapezoidal flange provided in said recessed portion, the diameter of said flange being smaller than that of said bore, the end walls of said recessed portion sloping towards said flange to permit a substantially uniform flow through said recess in any axial position of said spool, and wherein the ratio of the outer diameter of respective piston areas to the diameter of the recessed portion of the spool is between 2.0 and 3.5, particularly 2.5; the ratio of respective outer diameters of the piston areas to the maximum diameter of said flange is between 1.0 and 2.0, particularly 1.5; the ratio of respective outer diameters of said piston areas to the diameter of inlet openings between said inlet ports and said bore is between 1.5 and 4.0, particularly 2.7; the ratio of the outer diameter of respective piston areas to the diameter of outlet openings between the bores and said outlet port is between 1.5 and 4.0, particularly 2.5; the ratio of the distance between the center points on the outlet and inlet openings and the outer diameter of respective piston areas is between 1.0 and 3.0, particularly between 1.1 and 1.4; wherein the distance between the center points of the inlet and outlet openings is equal to or smaller than the distance between the control edges of the two piston areas and is equal to or smaller than the sum of the distance between the center points of said inlet and outlet openings and the average value of the diameters of the inlet and outlet openings; and the angle of inclination of the sides of said trapezoidal falnge near the inlet port is equal to or larger than the end wall of said recessed portion near the inlet port being inclined about an angle $a_1$ and is equal to or lower than the range from 40° to 70°, respectively 47°.

* * * * *